Nov. 20, 1923.

H. W. KOEHLER 1,475,122

VEHICLE WHEEL STEERING APPARATUS

Filed Aug. 2, 1921

INVENTOR.
Henry W Koehler
BY A.B.Bonnau
ATTORNEYS.

Patented Nov. 20, 1923.

1,475,122

UNITED STATES PATENT OFFICE.

HENRY W. KOEHLER, OF SAN YSIDRO, CALIFORNIA, ASSIGNOR TO RALPH W. ABBOTT, OF SAN DIEGO, CALIFORNIA.

VEHICLE WHEEL-STEERING APPARATUS.

Application filed August 2, 1921. Serial No. 489,186.

*To all whom it may concern:*

Be it known that I, HENRY W. KOEHLER, a citizen of the United States, residing at San Ysidro, in the county of San Diego and State of California, have invented certain new and useful Improvements in Vehicle Wheel-Steering Apparatus, of which the following is a specification.

My invention relates to a vehicle wheel steering apparatus, more particularly for self propelled vehicles and the objects of my invention are: first, to provide an apparatus of this class whereby the axle is pivotally connected to the wheel in alinement with the center of the wheel, thereby reducing to a minimum the strain and vibration; second, to provide an apparatus of this class, in which the wheel hub is so constructed that the axle extends to the middle of the hub and in alinement with the center of gravity of the wheel, thus providing a steering apparatus that will permit a very short turn of the vehicle; third, to provide an apparatus of this class which is applicable for use in connection with either wire or wooden spoke wheels as desired; fourth, to provide an apparatus of this class in which the operation of turning the wheels is easily and readily accomplished; fifth, to provide an apparatus of this class in which the load on the vehicle is supported in central alinement with the wheels of the vehicle, and sixth, to provide an apparatus of this class which is very simple and economical of construction, durable, easy to operate, easy to install and which will not readily deteriorate or get out of order.

Figure 1:
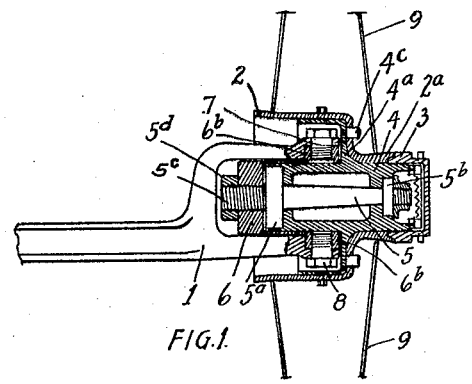
Figure 2:
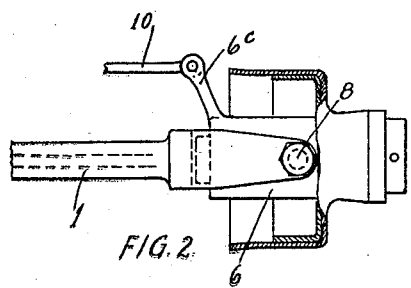
Figure 3:
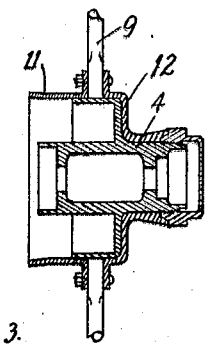

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a sectional view of a fragmentary portion of a hub of a wire spoke wheel, showing some of the inner working parts and portions of the hub in elevation to facilitate the illustration. Fig. 2 is a top or plan view of the hub and axle and showing a fragmentary portion of the steering gear in connection therewith, and Fig. 3 is a sectional view of the hub portion in a slightly modified form showing the application of the apparatus to a wooden spoke wheel.

Similar characters of reference refer to similar parts and portions throughout the several views of the drawings.

The vehicle axle 1, hub flange member 2, hub cap 3, spindle bearing member 4, spindle 5, spindle support 6, swivel bolts 7 and 8, spokes 9 and steering rod 10, constitute the principal parts and portions of my vehicle wheel steering apparatus.

The hub member 2 is an annular hollow member provided with a reduced portion $2^a$ which fits snugly over the one end of the member 4 and against a shoulder $4^a$ thereof and is held in position by means of the hub cap 3 which is screwed onto the outer end of the member 4 and locked thereon in a conventional manner. The member 4 is provided with extended lugs $4^c$ which extend out through holes in the member 2, which prevent the torsional movement of the member 4, relatively to the member 2, but permits it to be shifted sideways relatively thereto when the cap 3 is loosened for repairs and the like. This member 4 is provided internally with a spindle 5 which is supported by bearings $5^a$ and $5^b$ which may be of the conventional type of ball or roller bearings positioned at opposite ends. This spindle 5 is supported on the axle 1 by means of the spindle support 6 which is an annular sleeve member provided with a hole in one end adapted to receive the extended threaded end $5^c$ of said spindle and held securely by means of the nut $5^d$. This member 6 extends over the one end of the member 4 and between the extended ends of the axle 1 with clearance between both to provide free movement. This member 6 is provided on its upper and lower sides, at its outer end and centrally in line with the wheel with extended lug portions $6^b$ which are adapted to receive the swivel bolts 8 on each side, which serve as spindles for the bifurcated portion of the axle 1, it being noted that the axle 1 is bifurcated at the end and provided with a journal member on each member of the axle and the member 6 is adapted to swivel in the bifurcated portion of the axle. This member 6 is also provided with an extended lug portion $6^c$ normally outside of the hub member 2, to which is connected the conventional steering rod 10.

In the modified form of construction shown in Fig. 3 of the drawings, the hub member is divided into two members 11 and 12 for supporting the spokes between the two members.

The remainder of the structure is the same as that of Figs. 1 and 2 of the drawings.

Though I have shown and described a particular construction, combination and arrangement of parts and portions and certain modifications thereof I do not wish to be limited to this particular construction, combination and arrangement nor to the modifications thereof but desire to include in the purview of my invention the construction, combination and arrangement substantially as set forth in the appended claims.

It is obvious that with this construction there is provided a vehicle steering wheel apparatus in which the axle extends into a hollow hub, so that the pivotal mounting of the axle is in alinement with the center of the wheel, thus providing for more easily turning the wheel, reducing the vibration and suspending the load in the center of the wheel; that the structure as a whole is very simple of construction and operation.

Having thus described my invention, what I claim as new and desire to secure by Letters Patent is:

1. An apparatus of the class described, including a vehicle wheel hub provided with an annular recess in the inner side thereof, a separate inner hub member secured thereto and extending centrally in said recess, forming a spindle bearing and provided with an extended annular flange conforming to the interior of said wheel hub, a spindle on which said hub member is revolubly mounted, an annular sleeve secured to said spindle and extending over said inner hub member and an axle with bifurcated end pivotally mounted on said sleeve in alinement with the middle of the wheel, and a steering apparatus in connection with said sleeve.

2. An apparatus of the class described, including a vehicle wheel hub provided with an annular recess in the inner side thereof, a separate inner hub member secured thereto and extending centrally in said recess, forming a spindle bearing, a spindle on which said hub member is revolubly mounted, an annular sleeve secured to said spindle and extending over said inner hub member and provided with internally threaded recesses, bolts mounted in said recesses, an axle with bifurcated end pivotally mounted on said bolts in alinement with the middle of the wheel and a steering apparatus in connection with said sleeve.

3. An apparatus of the class described, including a vehicle wheel hub provided with an annular recess in the inner side thereof, a separate inner hub member secured thereto and extending centrally in said recess, forming a spindle bearing and provided with an extended annular flange conforming to the interior of said wheel hub, a spindle on which said hub member is revolubly mounted, an annular sleeve secured to said spindle and extending over said inner hub member and provided with internally threaded recesses, bolts mounted in said recesses, an axle with bifurcated end pivotally mounted on said bolts in alinement with the middle of the wheel, and a steering apparatus in connection with said sleeve.

In testimony whereof, I have hereunto set my hand at San Diego, California, this 31st day of May, 1921.

HENRY W. KOEHLER.